United States Patent [19]

Nussbaumer et al.

[11] 3,949,859
[45] Apr. 13, 1976

[54] APPARATUS FOR GRABBING, HOLDING AND TRANSPORTING WORKPIECES ON A CONVEYOR CHAIN

[75] Inventors: Manfred Nussbaumer, Dietikon; Karl Boesch, Spreitenbach, both of Switzerland

[73] Assignee: Micafil A.G., Zurich, Switzerland

[22] Filed: May 21, 1975

[21] Appl. No.: 579,582

[30] Foreign Application Priority Data
May 30, 1974   Switzerland.......................... 7377/74

[52] U.S. Cl. ............ 198/19; 104/172 BT; 104/252; 269/56; 294/34; 294/115
[51] Int. Cl.² ..................... B23Q 7/00; B61B 13/00
[58] Field of Search........... 198/19, 179; 104/172 R, 104/172 B, 172 C, 172 BT, 249, 250, 252; 214/1 BA; 294/34, 115; 269/55, 56

[56] References Cited
UNITED STATES PATENTS

| | | | |
|---|---|---|---|
| 2,367,991 | 1/1945 | Bailey..................................... | 294/34 |
| 3,057,456 | 10/1962 | Heinzer............................ | 104/172 R |
| 3,161,145 | 12/1964 | Cargill et al. .................... | 104/172 R |
| 3,204,756 | 9/1965 | Lesch................................ | 104/172 R |
| 3,207,500 | 9/1965 | Kooy................................. | 104/172 R |
| 3,357,368 | 12/1967 | Fonden.......................... | 104/172 BT |
| 3,386,726 | 6/1968 | Lorenz.................................... | 269/55 |
| 3,655,030 | 4/1972 | Hardwig........................... | 104/172 B |
| 3,666,076 | 5/1972 | Miller et al. ........................... | 198/19 |

Primary Examiner—Evon C. Blunk
Assistant Examiner—Joseph E. Valenza
Attorney, Agent, or Firm—Pierce, Scheffler & Parker

[57] ABSTRACT

Apparatus for transporting work pieces by means of work piece pickups engageable with a chain type conveyor to a plurality of work stations located along the path of the conveyor. Work piece pickups located between parallel spaced guide rails which are disposed above two parallel spaced endless link type chains are provided with guide rolls which engage the undersides of the guide rails and with pivotally mounted carrier arms provided with toe portions adapted to engage the links in the conveyor chains. Means are provided at each work station to stop one, or a group, of work piece pickups while the conveyor chains continue to move and to actuate a gripping device for releasing the work piece so that it can be worked on.

10 Claims, 11 Drawing Figures

APPARATUS FOR GRABBING, HOLDING AND TRANSPORTING WORKPIECES ON A CONVEYOR CHAIN

The present invention relates to an approved apparatus to grab, hold and transport work pieces, e.g. electrical coils, by means of one or more work piece pickups which can be stopped individually, or in groups, each of the pickups being connected to an endless transporting chain by a friction type coupling engageable with the chain links.

Various arrangements have been used heretofore in order to accomplish a continuous engagement of the work piece pickups by conveying systems. It is known to employ storage belts where the work pieces are engaged within one plane by friction between the work piece and the belt, the friction being generated by the inherent weight of the work piece pickup and/or the materials to be transported. Known also are conveyor belts where magnets are used to provide the frictional force. The empty holding means, the work piece carriers or the work pieces are then returned by means of a second conveyor belt, requiring transloading or transferring this material, for example, by means of a chute, lifting device or the like. It has also been proposed to accomplish the engagement of the work piece pickup, independent of its position, by friction between a conveyor belt and the work piece pickup where the conveyor belt is given a sufficient tractive force, and thus a sufficiently large force component for the frictional contact with the work piece pickup. However, some slipping became unavoidable when the work piece pickup is required to be turned by 360°.

A primary object of the invention is to provide for a continuous engagement of the work piece pickup, regardless of its position, by a conveying apparatus which is simple in design and which insures a reliable turning of the work piece pickup, even by 360°, and where the work piece pickup must stop precisely and without undue contact. The work piece must be held and released carefully and with precision.

This problem is solved in such manner that each work piece pickup is arranged movable regardless of its position and is provided on both sides with pairs of guide rolls, further with individual pivotally mounted carrying arms with or without friction linings which will interlock in a releasable manner within the links of a transporting chain, whenever the pickup is stopped at a work station and with one thrust bearing each, accommodating a pressure spring which loads the carrying arms in the chain engaging direction, with the work piece pickup placed between two upper guide rails engaged by the guide rolls and a pair of parallel-running endless transporting chains which slide within slots provided in guides and are attached to side plates of the conveying system. The invention is advantageous because its design and construction are more simple, more economic and operationally safer than other, functionally equivalent, arrangements.

According to the best mode of the invention, the ends of the carrying arms terminate in toe portions provided with bevels possessing diverse angles in relation to the longitudinal axis of the link chains. A steep bevel on the toe of the carrying arm insures a secure engagement between a link of the chain and toe and hence also of the work piece pickup, even in the case of a 360° turn, and especially during the transition from the lower to the upper flight of the chain, and vice versa. When the work piece pickup is stopped, a slight bevel on the toe is specifically instrumental in achieving an almost silent gliding of the carrying arms at its point of contact with the still moving transporting link type chain.

It will further be advantageous to affix stop pins to one or both sides of the work piece pickups, and to place controllable stops at the side plates for engagement with these pins to effect stopping of the work piece pickups at a work station. It becomes thus possible to stop and position the work piece pickups individually or in groups, as desired, while the transporting chains will continue to run, without prior selection of the pickup units. There exists the possibility of linking non-synchronously operating machines, thus making unnecessary the return of empty work piece pickups to the loading station.

It is particularly advantageous to provide a pair of grippers, which are arranged axially, symmetrically and parallel to each other movable on a guide shaft mounted in a housing of the work piece pickup, with interchangeable clamps and to employ an operating unit for closing and opening the grippers and clamp structure. This arrangement will make feasible a precise pickup, holding and release of work pieces, even in the case of changes in work piece diameter, for example, unfinished as well as wound coil bodies.

It will be expedient to provide the clamps, holding the work pieces, with opposed recesses; and to design the recesses in such manner that their inside areas will match the work piece profile. It will thus become possible for one set of clamps to hold safely and with care, and to center at a sufficiently strong clamping force and throughout a greater range of diameters, work pieces of various sizes.

It will be advantageous if the carrying arms and the slotted guides in which the transporting chains run, are made of wear-resistant synthetic plastic material. Such plastic chain guides have a long service life and do not require any significant maintenance work. Glassfiber-reinforced synthetic materials, preferably on a polyacetate basis, were found to be particularly advantageous for the housing of the work piece pickup.

The placement of stop and spacer pieces with facings at the opposite ends of the work piece pickups will be expedient. This will insure precise spacings between work piece pickups, especially important for multiple stations, for example, winding stations, where several work piece pickups are brought up simultaneously, and will remain at these processing stations while the work pieces are worked on there simultaneously.

The accompanying drawings illustrate schematically a preferred embodiment of a work piece pickup as proposed by the invention.

Figure 3A:
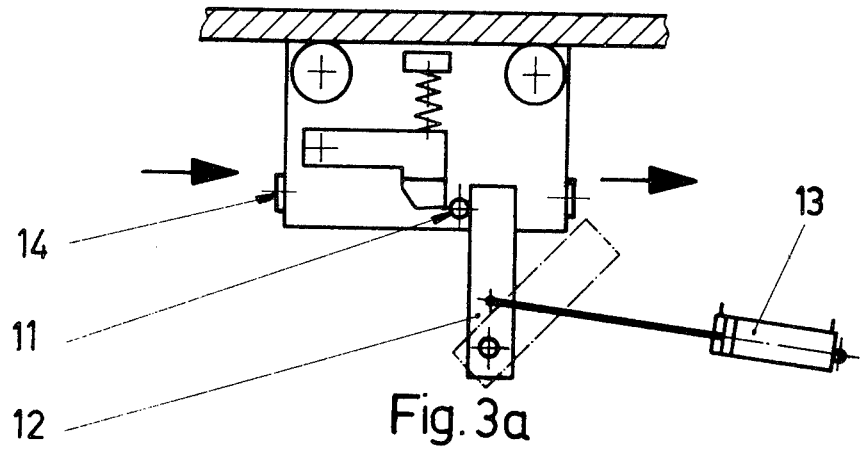
FIG. 3a is a side view of the work piece pickup with a stop pin and retaining component.
Figure 3C:
Figure 3B:
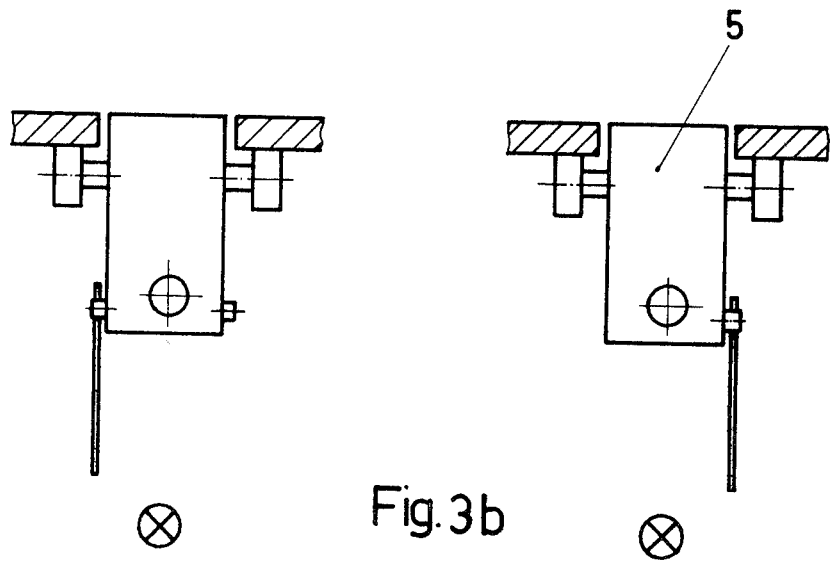
Figure 4A:
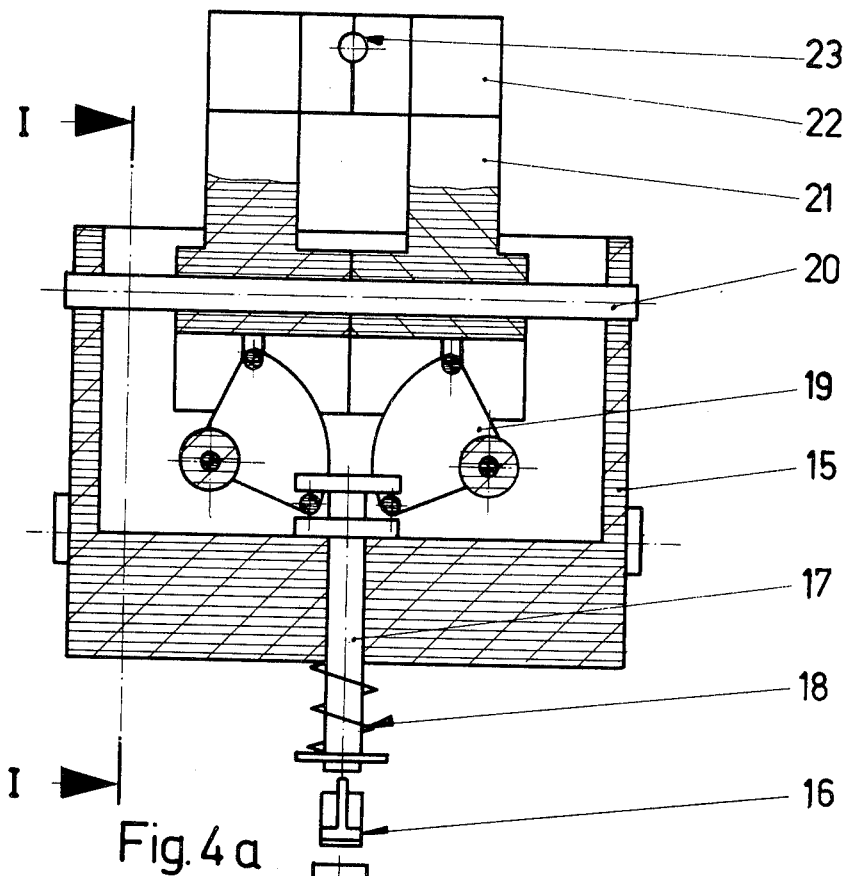
Figure 4B:
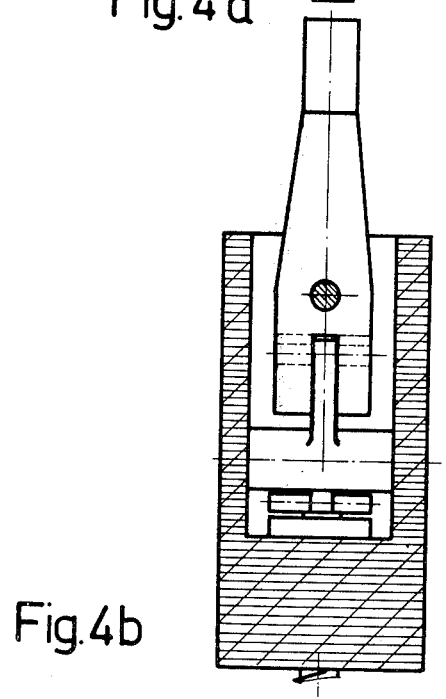

FIG. 3b an end view of the work piece pickup with a stop pin and retaining component;

FIG. 3c is a side view of a plurality of work piece pickups grouped by a retaining component;

FIG. 4a is a longitudinal view of the work piece pickup;

FIG. 4b is a cross sectional along line I—I of the work piece pickup.

Figure 1A:
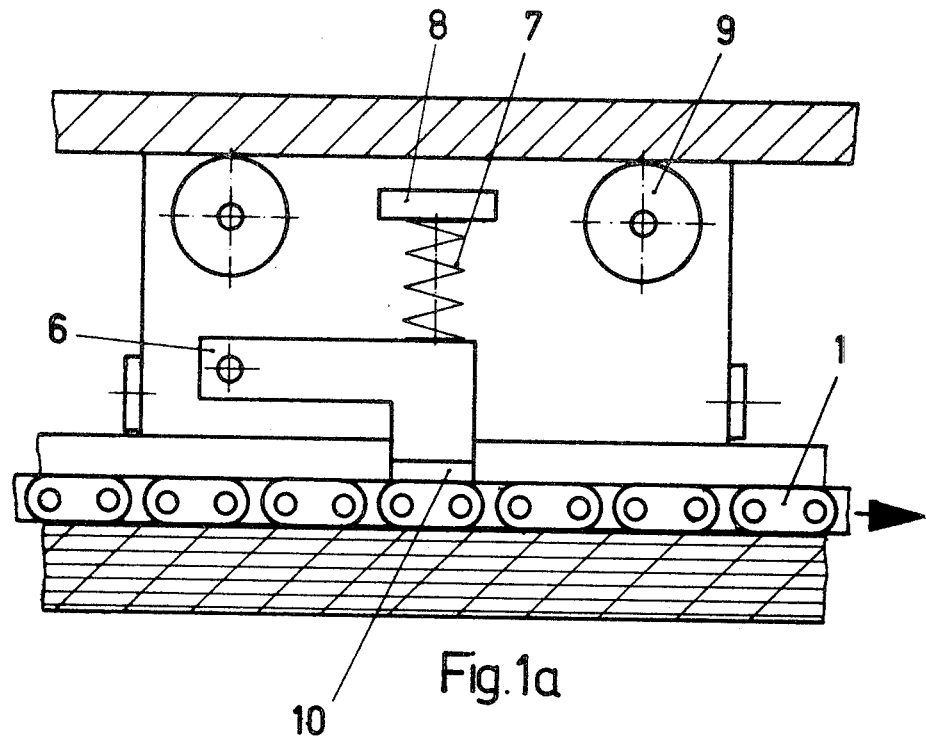
FIG. 1a is a side view of the transport apparatus.
Figure 1B:
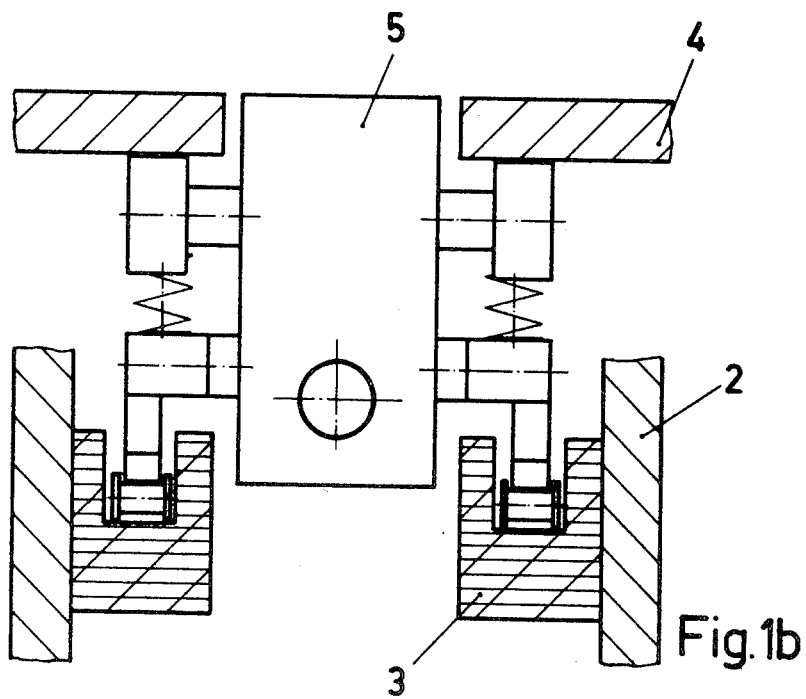
FIG. 1b is an end view of the transport apparatus.

With reference now to the drawings, FIGS. 1a and 1b show the apparatus and the conveying device consisting of two parallel spaced side plates 2 each and the guide rails 4. Between the side plates 2 there are arranged chain guides 3 profiled longitudinally to establish retaining slots which receive and conduct respectively a parallel-running pair of transporting endless link type chains 1. The work piece pickup 5 positioned between the guide rails 4 comprises two pairs of pressure rolls 9, pivotally mounted carrying arms 6 and one thrust bearing 8 each, with pressure spring 7 for loading the rolls 9 against the guide rail 4. The accommodation of the work piece, for example, an electrical coil 23, within work piece pickup 5 is shown in detail by FIG. 4.

FIGS. 2a to 2d illustrate four positions of the pivotable carrying arm 6, in the example shown with the friction linings 10 on their bevelled toe portions 6a, depicting in particular the position of the toe end 6a of the carrying-arm provided with one slight bevel 10a and one steep bevel 10b on adjacent faces of the toe.

FIGS. 3a and 3b illustrate schematically portions of the work piece pickup 5 with the arresting component structure, specifically the stop pins 11 and the controllable stops 12 with the pneumatic cylinders 13. FIG. 3c shows a stopping of work piece pickups 5 in a group, with the precise spacing between pickups insured by the placement of stop- and spacer members 14 at the opposite ends of all the work piece pickups, illustrated by FIG. 3a.

The work piece pickup shown by FIGS. 4a and 4b consists of an operating unit 16, for example, a pneumatic cylinder, a compression spring 18 surrounding a press rod 17 which passes through the housing 15 of the work piece pickup 5 and actuates one pair of grippers 21 with clamps 22 towards and away from each other by way of two oscillatable segments 19. An independent mounting of the segments 19 prevents any turning of the pair of grippers 21 about their guide shaft 20 which is seated within the housing 15.

The mode of operation of the apparatus proposed by the invention will now be explained in detail.

The two endless chains 1 of the conveying system 1, 2, 3 and 4, as shown by FIGS. 1a and 1b, which run continuously in one direction and parallel to each other, interconnect in an advantageous manner several, not illustrated stations of a production line, used for example to manufacture electrical coils, with the work piece pickups 5 being conveyed continuously from the loading station to the individual processing stations up to the discharge station. The chains 1 run almost silently within the guides 3, designed in slot form and made, for example, from synthetic material, and can be turned through 360°. The work piece pickup 5, located within the conveying system, presses with its pressure springs 7, seated in the thrust bearings 8, first against the contact surfaces of the upper guide rails 4 by way of the two pairs of rolls 9, and secondly with the carrying-arm ends 6a into the chains 1 so that the work piece pickup 5 is carried along by the chains 1. The pressure springs 7 are adjustable. The shape of the toe portions 6a of the individual pivotally mounted carrying arms 6, with or without friction linings 10, is particularly important for a secure engagement of the work piece pickup 5 with the transporting chains 1. The toe portion 6a of carrying arm 6 is provided in the running direction of the chain 1 at its rear side with a steep bevel 10b which forms an angle of more than 45° with the horizontal plane of the transporting chain 1. The bevel generates a contact pressure component which will increase the frictional forces correspondingly and thus insure an interlock between the profiled ends 6a of the carrying arms within the gap between the side plates of the links of the transporting chain. The slight bevel 10a, which varies by only a few degrees from the horizontal plane of the chain, is provided in the front in the running direction of the transporting chain 1. It serves to return slowly into its position the carrying arm 6 which is pushed quickly aside when the bevel 10a runs up onto the link connecting pins of the chain. This measure prevents the carrying arm 6 from lifting off the pin due to its natural inertia and to snap back subsequently. The unlike motions during the up and down stroke of the carrying arm prevents any simultaneous spring vibration and thus any resonance vibrations from being induced in the arm. The bevel 10a will prevent any excessive penetration of the tip of the toe 6a of the carrying arm into the chain links, and thus prevent generation of excessive noise.

Figure 2A:
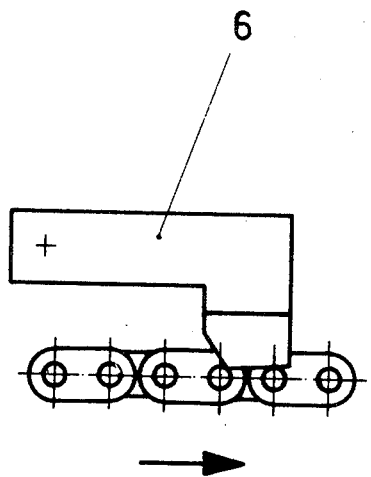
FIG. 2a shows a first position of the pivotable arm engaging the endless chain.
Figure 2B:
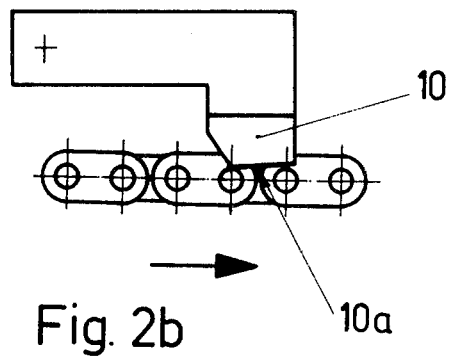
FIG. 2b shows a second position of the pivotable arm engaging the endless chain.
Figure 2C:
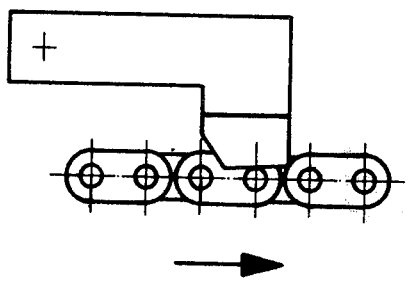
FIG. 2c shows a third position of the pivotable arm engaging the endless chain.
Figure 2D:
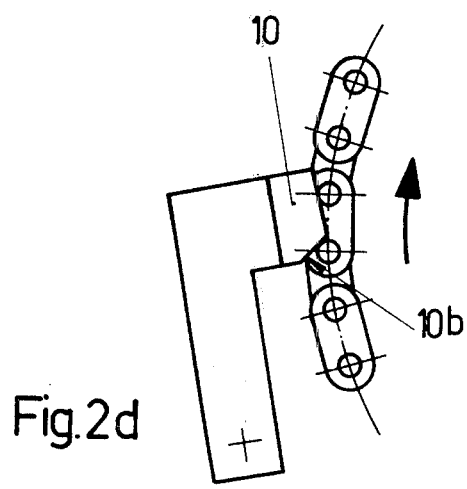
FIG. 2d shows a fourth position of the pivotable arm engaging the endless chain.

FIGS. 2a, 2b, 2c show the sliding of the two carrying arms 6 of a, not illustrated, stopped work piece pickup 5 along the continuously moving chains. FIG. 2d shows that the carrying arms 6 are forced further away during the turn part of the endless chains while the toe portions 6a of the carrying-arm, with or without friction linings 10, and loaded by springs 7 are able to penetrate deeper into the links due to the steep bevels 10b, thus insuring a secure engagement with the links. The arresting components of the apparatus proposed by the invention are illustrated schematically in FIGS. 3a, 3b and 3c. The work piece pickups 5 move along a conveying system by way of a continuously driven pair of endless link type chains 1 which run in slots within guides 3 as shown in FIG. 1b. The work piece pickups 5 can be arrested and stopped individually or in groups at one or more specific points along the chain as required. In the embodiment shown, the foremost work piece pickup 5 is provided with stop pins 11 on both sides while the following work piece pickups 5 of a group have stop pins 11 on one side only. By appropriately arranging the retaining components 11, 12, 13, i.e. the controllable stops 12 actuated by pneumatic cylinders 13, it will become possible to stop, by their actuation, either the foremost work piece pickup 5 in a group and thereby the entire group at the same time, or to stop individual pickups 5 one after the other as desired at independent intervals. When work piece pickups 5 are guided in groups to the individual processing i.e. work stations, it is important to provide precise intervals between the individual work piece pickups; this is accomplished by stop and spacer pieces 14 provided with facings at the opposite ends of the pickup.

FIGS. 4a and 4b illustrate grabbing and holding of the work pieces by the pickup. Within the housing 15 of the work piece pickup 5 there is arranged one pair of grippers 21 which can move back and forth axially on a guide shaft 20, with the grippers moving symmetrically to each other in parallel by way of separately pivotally mounted turnable guide segments 19, actuated by the press rod 17, thus being prevented from turning about the guide shaft 20. The guiding segments 19 which can pivot in guide slots 21a of a pair of grippers 21 and have an oscillation type of movement serve the purpose of transferring the forces and movements from the press rod 17 symmetrically to both the grippers of each pair 21. The adjustable compression spring 18 surrounding rod 17 furnishes the clamping force for the grippers 21 to hold them closed, which is required to hold a work piece securely but carefully. An unfinished, or a wound coil body 23 so held is conveyed to a winding station or to some other processing stations to be released there. The spring force of the compression spring 18 can be overcome by an operating unit 16, preferably a pneumatic cylinder, and the grippers 21 will move apart to release the coil, and clear at the same time a working space necessary for the processing of the coil, whereby the work piece pickup 5 can remain within the production area in order to take over again the coil, upon termination of the processing at this station, by the closing of the coil holders 22, and to convey the coil to another station.

We claim:

1. Apparatus for transporting work pieces by means of work piece pickups engageable with a chain type conveyor to a plurality of work stations located along the conveyor comprising a pair of parallel spaced endless link type conveyor chains movable along a path at which the work stations are located, a pair of parallel spaced guide rails also located in parallel spaced relation above said pair of conveyor chains, work piece pickups located between said spaced guide rails, each said work piece pickup including laterally extending guide rolls which are spring loaded into engagement with the undersides of said guide rails and a pair of laterally extending pivotally mounted carrier arms including toe portions which are spring loaded into engagement with the links of the chains thereby serving to transport said work piece pickups along the chains to the various stations, means for stopping said work piece pickups at each station while permitting the chains to have a continuous motion and means carried by said work piece pickups for holding the work pieces.

2. Apparatus as defined in claim 1 for transporting work pieces wherein said toe portions of said pivotally mounted carrier arms are provided with adjacent bevels which possess diverse angles in relation to the longitudinal axis of the conveyor chains.

3. Apparatus as defined in claim 2 for transporting work pieces wherein one of said bevels on the toe portion of the carrier arm is steep to provide a more positive connection between the toe portion and the links of the conveyor chain and the other bevel is slight so as to better enable the toe portion to rise and fall with respect to the conveyor chain when the work piece pickup is stopped at a work station.

4. Apparatus as defined in claim 1 for transporting work pieces wherein said means for stopping said work piece pickups at each station while permitting the chains to have a continuous motion comprise stop means projecting laterally from the work piece pickup cooperative with controllable stops located at the work station.

5. Apparatus as defined in claim 1 for transporting work pieces wherein each said work piece pickup includes a housing within which are mounted a pair of grippers and means located at each work station for moving said grippers towards and away from each other to grab and release respectively the work piece.

6. Apparatus as defined in claim 5 for transporting work pieces wherein said pair of grippers are mounted for movement towards and away from each other on a guide shaft and interconnected with an operating shaft therefor extending downwardly through the bottom of said housing, said operating shaft being spring loaded in the downward position effecting a closing action of said grippers to grab the work piece and operating means located at each work station for raising said operating shaft thereby to open the grippers and release the work piece.

7. Apparatus as defined in claim 5 for transporting work pieces wherein said grippers include profiled grabbing surfaces matching those of the work piece to be held.

8. Apparatus as defined in claim 5 for transporting work pieces wherein said grippers are provided with interchangeable work piece clamping means.

9. Apparatus as defined in claim 1 for transporting work pieces wherein said conveyor chains are supported within guides made from a wear-resistant synthetic material and at least the toe portions of said carrier arm also are made from wear-resistant synthetic material.

10. Apparatus as defined in claim 1 for transporting work pieces wherein said work piece pickups are provided with spacer members at the end thereof for effecting proper spacing between adjacent pickups.

* * * * *